United States Patent
Jun et al.

(10) Patent No.: US 12,326,646 B2
(45) Date of Patent: Jun. 10, 2025

(54) VARIFOCAL LENS

(71) Applicant: INDUSTRY-ACADEMIC COOPERATION FOUNDATION, YONSEI UNIVERSITY, Seoul (KR)

(72) Inventors: SeongChan Jun, Seoul (KR); Sewon Park, Seoul (KR); YunJi Hwang, Seoul (KR); Chengyi Li, Seoul (KR)

(73) Assignee: INDUSTRY—ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 270 days.

(21) Appl. No.: 18/058,545

(22) Filed: Nov. 23, 2022

(65) Prior Publication Data
US 2023/0161218 A1 May 25, 2023

(30) Foreign Application Priority Data
Nov. 24, 2021 (KR) .................. 10-2021-0163352

(51) Int. Cl.
*G02F 1/29* (2006.01)
(52) U.S. Cl.
CPC .................. *G02F 1/294* (2021.01)
(58) Field of Classification Search
None
See application file for complete search history.

(56) References Cited

U.S. PATENT DOCUMENTS

| | | | | |
|---|---|---|---|---|
| 11,442,332 B1* | 9/2022 | Sprague | ............... | G02C 7/083 |
| 2004/0108984 A1* | 6/2004 | Ogasawara | ............... | G02F 1/29 |
| 2008/0151168 A1* | 6/2008 | Sekiguchi | ......... | G02F 1/134309 |
| | | | | 349/142 |
| 2010/0265552 A1* | 10/2010 | Wang | ....................... | G02F 1/29 |
| | | | | 359/9 |
| 2011/0069243 A1* | 3/2011 | Chang | ............... | G02F 1/134309 |
| | | | | 349/200 |
| 2011/0234934 A1* | 9/2011 | Chang | ................ | G02F 1/13471 |
| | | | | 349/74 |

(Continued)

FOREIGN PATENT DOCUMENTS

| KR | 10-2078551 B1 | 2/2020 |
|---|---|---|
| KR | 10-2216174 B1 | 2/2021 |

OTHER PUBLICATIONS

Office Action received in Application KR 10-2021-0163352 dated Oct. 6, 2023 in 8 pages.

*Primary Examiner* — Ryan Crockett
(74) *Attorney, Agent, or Firm* — Knobbe Martens Olson & Bear LLP (57) ABSTRACT

A varifocal lens is provided. A varifocal lens includes: a transparent substrate having a plate shape; a first lens layer stacked on a first area formed on one surface of the transparent substrate; a second lens layer stacked on a second area which is spaced apart from the first area and formed on the one surface of the transparent substrate; and a power supply connected to the first lens layer and the second lens layer to, based on the second lens layer, apply a first voltage to the first lens layer. The power supply may adjust the first voltage and change a refractive index of light, which is incident on the other surface of the transparent substrate and transmitted toward the one surface of the transparent substrate, to adjust a focal length.

20 Claims, 9 Drawing Sheets

(56) References Cited

U.S. PATENT DOCUMENTS

| | | | | |
|---|---|---|---|---|
| 2012/0075569 | A1* | 3/2012 | Chang | G02F 1/29 |
| | | | | 349/200 |
| 2013/0038937 | A1* | 2/2013 | Boreman | G02B 5/1876 |
| | | | | 257/E33.001 |
| 2015/0293353 | A1* | 10/2015 | Chin | G02F 1/134309 |
| | | | | 349/123 |
| 2015/0316820 | A1* | 11/2015 | Duston | G02F 1/13439 |
| | | | | 349/138 |
| 2016/0000557 | A1* | 1/2016 | Galstian | A61F 2/16 |
| | | | | 623/6.22 |
| 2016/0097948 | A1* | 4/2016 | Chin | G02F 1/134309 |
| | | | | 349/123 |
| 2018/0246354 | A1* | 8/2018 | Popovich | G02F 1/1334 |
| 2019/0235348 | A1* | 8/2019 | Jun | G02B 3/08 |
| 2021/0349338 | A1* | 11/2021 | Koito | G02F 1/133531 |
| 2021/0349344 | A1* | 11/2021 | Koito | H04N 23/00 |
| 2023/0176446 | A1* | 6/2023 | Shibuya | G02F 1/1343 |
| | | | | 349/200 |
| 2023/0288775 | A1* | 9/2023 | Feng | G02F 1/294 |
| 2024/0134234 | A1* | 4/2024 | Shibuya | G02C 7/101 |

\* cited by examiner

VARIFOCAL LENS

CROSS-REFERENCE TO RELATED APPLICATION

This application claims priority to and the benefit of Korean Patent Application No. 10-2021-0163352, filed on Nov. 24, 2021, the disclosure of which is incorporated herein by reference in its entirety.

BACKGROUND

1. Field

The present disclosure relates to a varifocal lens, and more particularly, to a varifocal lens capable of dividing a divided lens layer into a plurality of areas and applying a different voltage to each of the divided areas to change a focal length.

2. Discussion of Related Art

A Fresnel lens is a lens that functions in the same way as a convex lens but has a reduced thickness. In order to reduce the thickness of the lens, the lens is divided into a plurality of shapes of bands in the Fresnel lens. The Fresnel lens is utilized in various fields such as lighthouses, vehicle taillights, cameras, optical projectors, and solar cells and has various sizes ranging from several hundreds of micrometers (μm) to several meters (m).

In a typical Fresnel lens, a plurality of circular bands are periodically formed. The Fresnel lens has a structure in which an interval between the circles gradually decreases away from the circle located at the center. Since a focal point of the Fresnel lens having such a structure is formed at a fixed position, the position of the focal point cannot be changed.

The disclosure of this section is to provide background information relating to the present disclosure. Applicant does not admit that any information contained in this section constitutes prior art.

SUMMARY

A varifocal lens capable of providing a plurality of focal lengths can be provided by forming a Fresnel lens with graphene, applying a voltage to the graphene, and changing a refractive index of light applied to the graphene. However, the focusing efficiency is low due to high transmittance of the graphene.

Accordingly, there may be a need for a varifocal lens that can improve the low focusing efficiency due to graphene while easily controlling a focal length using a voltage has come to the fore.

The present disclosure is directed to providing a varifocal lens capable of forming a plurality of focal lengths using a single lens.

The present disclosure is also directed to providing a varifocal lens capable of increasing a refractive index change range.

The present disclosure is also directed to providing a varifocal lens capable of minimizing the size of the lens.

Objectives of the present disclosure are not limited to the above-mentioned objectives, and other unmentioned objectives should be clearly understood by those of ordinary skill in the art to which the present disclosure pertains from the description below.

One aspect of the present disclosure provides a varifocal lens including: a transparent substrate having a plate shape; a first lens layer stacked on a first area formed on one surface of the transparent substrate; a second lens layer stacked on a second area which is spaced apart from the first area and formed on the one surface of the transparent substrate; and a power supply connected to the first lens layer and the second lens layer to, based on the second lens layer, apply a first voltage to the first lens layer, wherein the power supply may adjust the first voltage and change a refractive index of light, which is incident on the other surface of the transparent substrate and transmitted toward the one surface of the transparent substrate, to adjust a focal length.

Here, the first lens layer and the second lens layer may include at least one graphene layer and at least one transition metal dichalcogenide (TMDC) layer which are alternately stacked outward from the one surface of the transparent substrate.

Here, the second area may be formed to be spaced apart from an edge portion of the first area and surround the first area.

Here, the first area may be formed in a circular ring shape.

Here, the first area may be formed in a circular shape.

Here, an edge portion of the first area may be divided from a central portion thereof, and the edge portion of the first area may be formed in the shape of a band having a predetermined width.

Here, the TMDC layer may include a material whose chemical formula is $MX_2$, wherein the M is an element belonging to transition metals of any one of Groups IV, V, and VI, and the X is an element belonging to the chalcogen group.

Here, the TMDC layer may include any one of $MoS_2$, $MoSe_2$, $MoTe_2$, $WS_2$, $WSe_2$, and $WTe_2$.

Here, the varifocal lens may further include a third lens layer stacked on a third area which is spaced apart from the first area and the second area and formed on the one surface of the transparent substrate, and the power supply may also be connected to the third lens layer to, based on the second lens layer, apply a second voltage to the third lens layer and may adjust the first voltage and the second voltage and change the refractive index of the light to adjust the focal length.

Here, the second area may be formed to be spaced apart from an edge portion of the first area and surround the first area, and the third area may be spaced apart from the first area and the second area and formed in the shape of a band having a predetermined width between the first area and the second area.

Here, the third area may be divided into a plurality of layers of bands in a width direction.

Another aspect of the present disclosure provides a varifocal lens including: a transparent terminal having a plate shape; a transparent substrate stacked on one surface of the transparent terminal; a first insulating layer and a first lens layer which are sequentially stacked on a first area formed on the other surface of the transparent terminal; a second insulating layer and a second lens layer which are sequentially stacked on a second area which is spaced apart from the first area and formed on the other surface of the transparent terminal; and a power supply connected to the first lens layer, the second lens layer, and the transparent terminal to, based on the transparent terminal, apply a first voltage and a second voltage to the first lens layer and the second lens layer, respectively, wherein the power supply may adjust the first voltage and the second voltage and change a refractive index of light, which is incident on the one surface of the transparent terminal and transmitted toward the other surface of the transparent terminal, to adjust a focal length.

Here, the first lens layer and the second lens layer may include at least one graphene layer and at least one transition metal dichalcogenide (TMDC) layer which are alternately stacked outward from the other surface of the transparent terminal.

Here, the second area may be formed to be spaced apart from an edge portion of the first area and surround the first area.

Here, the first area may be formed in a circular ring shape.

Here, the first area may be formed in a circular shape.

Here, an edge portion of the first area may be divided from a central portion thereof, and the edge portion of the first area may be formed in the shape of a band having a predetermined width.

Here, the TMDC layer may include a material whose chemical formula is $MX_2$, wherein the M is an element belonging to transition metals of any one of Groups IV, V, and VI, and the X is an element belonging to the chalcogen group.

Here, the TMDC layer may include any one of $MoS_2$, $MoSe_2$, $MoTe_2$, $WS_2$, $WSe_2$, and $WTe_2$.

Here, the varifocal lens may further include a third insulating layer and a third lens layer which are sequentially stacked on a third area which is spaced apart from the first area and the second area and formed on the other surface of the transparent terminal, and the power supply may also be connected to the third lens layer to, based on the transparent terminal, apply a third voltage to the third lens layer and may adjust the first voltage, the second voltage, and the third voltage and change the refractive index of the light to adjust the focal length.

Here, the second area may be formed to be spaced apart from an edge portion of the first area and surround the first area, and the third area may be spaced apart from the first area and the second area and formed in the shape of a band having a predetermined width between the first area and the second area.

Here, the third area may be divided into a plurality of layers of bands in a width direction.

BRIEF DESCRIPTION OF THE DRAWINGS

The above and other aspects, features and advantages of the present disclosure will become more apparent to those of ordinary skill in the art by describing example embodiments thereof in detail with reference to the accompanying drawings, in which.

DETAILED DESCRIPTION OF EMBODIMENTS

Hereinafter, embodiments of the present disclosure will be described in detail with reference to the accompanying drawings to allow those of ordinary skill in the art to which the present disclosure pertains to easily carry out the present disclosure. The present disclosure may be implemented in various different forms and is not limited to the embodiments described herein. In the drawings, parts unrelated to the description have been omitted for clear description of the present disclosure, and like reference numerals are assigned to like or similar components throughout the specification.

Terms used in this specification and the claims should be construed as having meanings and concepts that are consistent with the technical spirit of the present disclosure according to the principle that the inventor may define terms and concepts to describe his or her invention in the best way, rather than being construed as having general or dictionary meanings and being limited thereto.

Therefore, embodiments described in this specification and configurations illustrated in the drawings correspond to example embodiments of the present disclosure and do not represent the entire technical spirit of the present disclosure. Thus, various equivalents and modifications that may replace the corresponding configurations may be present at the time of filing of this application.

In this specification, terms such as "include" or "have" should be understood as specifying that features, numbers, steps, operations, components, parts, or combinations thereof are present and not as precluding the possibility of the presence or addition of one or more other features, numbers, steps, operations, components, parts, or combinations thereof in advance.

When a certain component is mentioned as being "above" or "below" another component, unless stated otherwise, it should be understood that the certain component may be disposed directly "above" or "below" the other component or another component may be present therebetween. Also, when a certain component is mentioned as being "connected" to another component, unless stated otherwise, the two comments may be directly connected to each other or indirectly connected to each other.

In the drawings, thicknesses or sizes of components have been exaggerated to clearly show features of the components, and the thicknesses or sizes of the components shown in the drawings may not be the actual thicknesses or sizes thereof. Hereinafter, description will be given assuming that, in FIG. 1, the X-axis is the left side, the Y-axis is the front side, and the Z-axis is the upper side.

Figure 1:
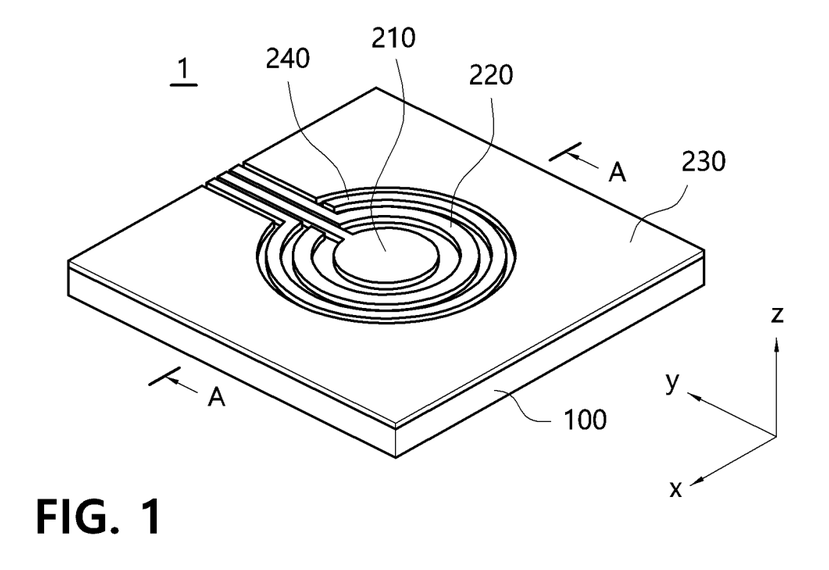
FIG. 1 is a perspective view of a varifocal lens according to an embodiment of the present disclosure.
Figure 2:
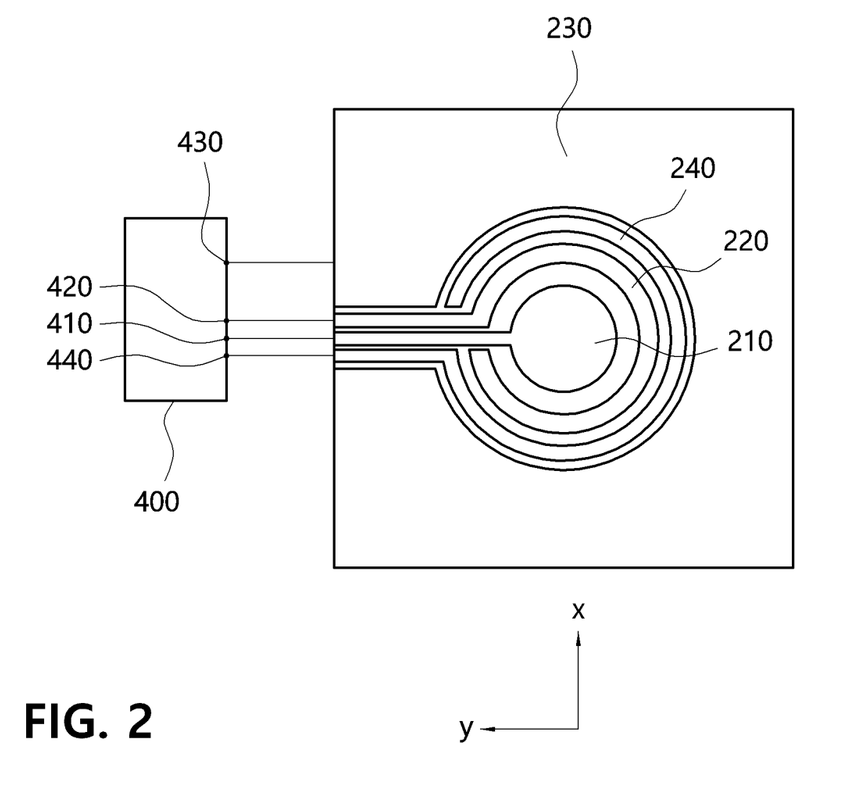
FIG. 2 is a wiring diagram of the varifocal lens according to the embodiment of the present disclosure.
Figure 3:
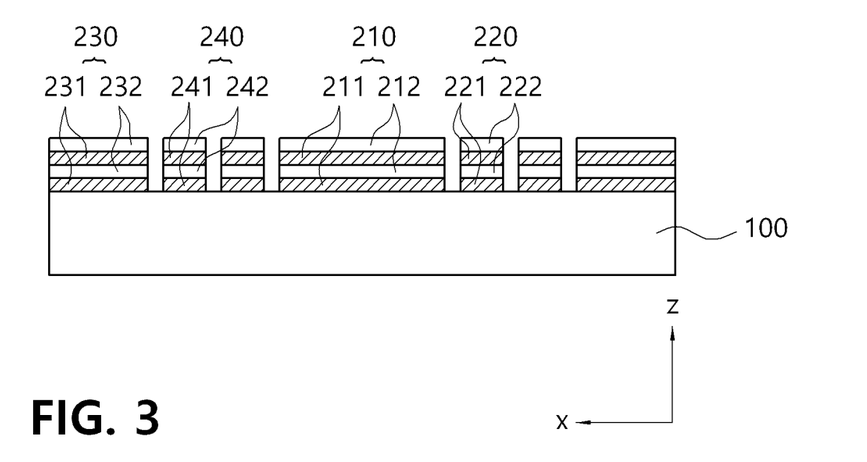
FIG. 3 is a cross-sectional view taken along line A-A of FIG. 1.
Figure 4:
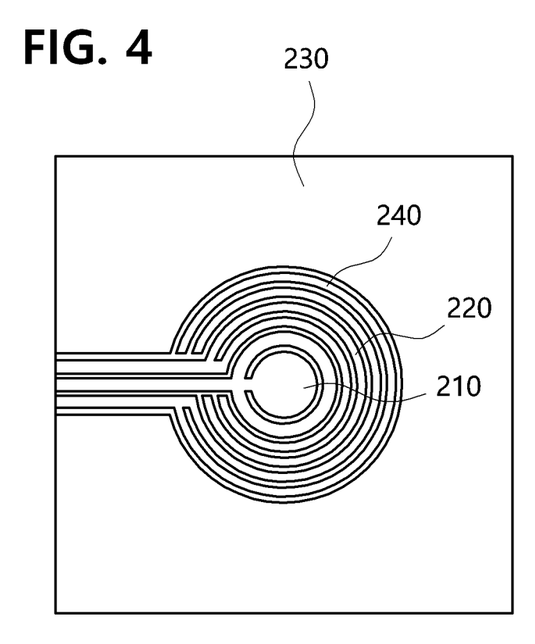
FIG. 4 is a perspective view of a varifocal lens according to one modification of the embodiment of the present disclosure.
Figure 5:
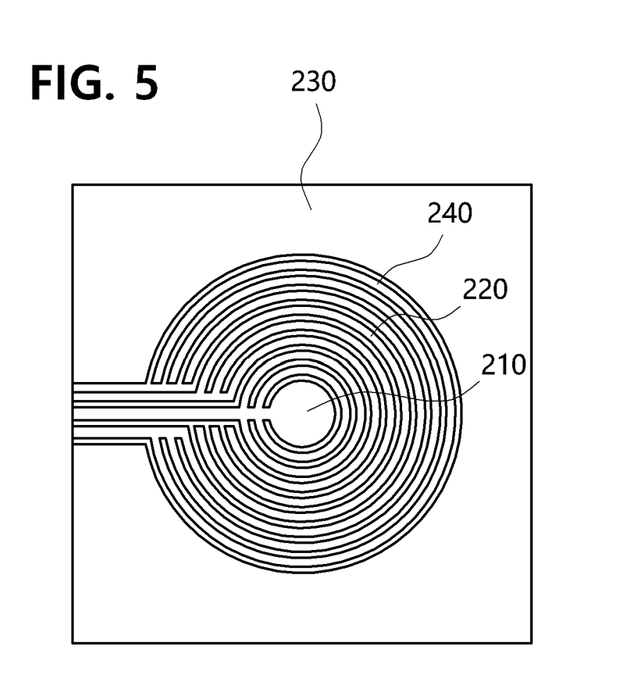
FIG. 5 is a perspective view of a varifocal lens according to another modification of the embodiment of the present disclosure.
Figure 6:
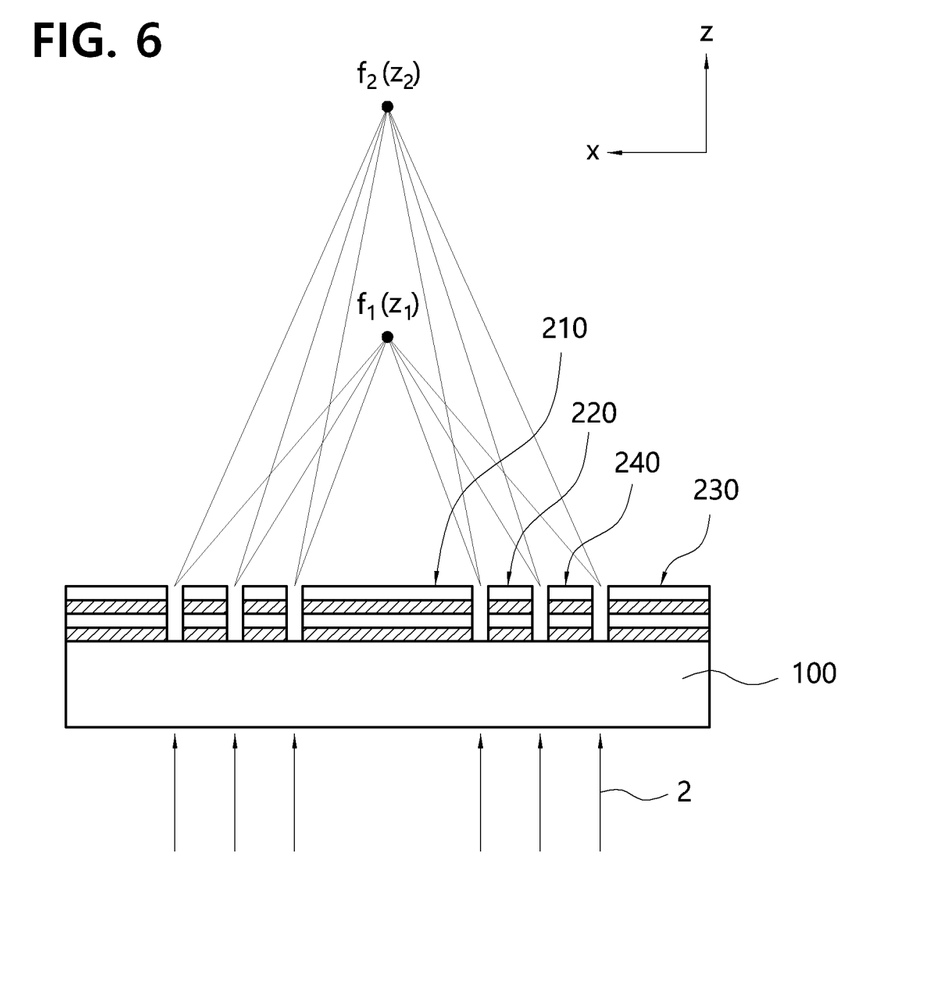
FIG. 6 is a view illustrating a use state of the varifocal lens according to the embodiment of the present disclosure.

FIG. 1 is a perspective view of a varifocal lens according to an embodiment of the present disclosure. FIG. 2 is a wiring diagram of the varifocal lens according to the embodiment of the present disclosure. FIG. 3 is a cross-sectional view taken along line A-A of FIG. 1. FIG. 4 is a perspective view of a varifocal lens according to one modification of the embodiment of the present disclosure. FIG. 5 is a perspective view of a varifocal lens according to another modification of the embodiment of the present disclosure. FIG. 6 is a view illustrating a use state of the varifocal lens according to the embodiment of the present disclosure.

Referring to FIGS. 1 and 2, a varifocal lens 1 according to an embodiment of the present disclosure includes a transparent substrate 100, a first lens layer 210, a second lens layer 230, a third lens layer 220, and a power supply 400.

As illustrated in FIG. 1, the transparent substrate 100 is formed in the shape of a plate having a predetermined thickness. The size of the transparent substrate 100 is not limited. That is, the transparent substrate 100 may be designed to have various sizes according to an environment in which the varifocal lens 1 according to the embodiment of the present disclosure is used. For example, the size of the transparent substrate 100 may vary according to resolution in a case in which the varifocal lens 1 is used as a lens of a camera or used as a lens of a display. The shape of the transparent substrate 100 may be square as illustrated in FIGS. 1 and 2 but is not limited thereto.

The transparent substrate 100 is formed of a material through which light can pass, such as glass or transparent plastic. The transparent substrate 100 may be formed in the shape of a plate through which light 2 is not refracted in a process in which the light 2 passes through the transparent substrate 100, but the shape of the transparent substrate 100 is not limited as long as the transparent substrate 100 can support the first lens layer 210, the second lens layer 230, and the third lens layer 220 which will be described below.

As illustrated in FIGS. 1 and 2, the first lens layer 210 is stacked on one surface of the transparent substrate 100. Here, as illustrated in FIG. 3, the first lens layer 210 is stacked on a first area 110 of the one surface of the transparent substrate 100. That is, the first lens layer 210 is formed in the same shape as the first area 110. Since the shapes of the first lens layer 210 and the first area 110 are the same, hereinafter, the shape of the first area 110 will be described using the shape of the first lens layer 210 shown in the drawings.

As illustrated in FIGS. 1 and 2, the first area 110 is formed on a central portion of the one surface of the transparent substrate 100. Here, the shapes of the first area 110 and the first lens layer 210 are not limited. For example, the first area 110 may be formed in the shape of a figure having a predetermined area. Here, the first area 110 may be formed in a circular shape or a circular ring shape. That is, the first area 110 may be formed to be symmetrical about a central point located on the one surface of the transparent substrate 100. In this way, light can be prevented from being refracted while being leaned toward one direction in a process of refracting light, and a focal point can be adjusted in the Z-axis direction based on the center of the first area 110.

As illustrated in FIG. 4, the first area 110 of the varifocal lens 1 according to one modification of the embodiment of the present disclosure may be formed in a shape in which a circle having a predetermined area is disposed on the central portion, a circular ring may be disposed apart from an edge of the circle, and one side of the circle is connected to one side of the circular ring. Also, as illustrated in FIG. 5, the first area 110 of the varifocal lens 1 according to another modification of the embodiment of the present disclosure may be formed in a shape in which a circle is disposed on the central portion, a plurality of circular rings are disposed outward and apart from an edge of the circle, and one side of the circle is connected to one side of each of the plurality of circular rings. By the first area 110 being formed to be divided as illustrated in FIGS. 4 and 5, a range in which the refractive index of the light 2 can be adjusted increases.

Here, as illustrated in FIG. 3, the first lens layer 210 may be formed by a first graphene layer 211 and a first transition metal dichalcogenide (TMDC) layer 212 being alternately stacked. Here, the number of stacked first graphene layers 211 and first TMDC layers 212 may be differently designed according to a target refractive index range and is not limited.

Graphene has a small thickness of about 0.2 nm, has excellent physical or chemical stability, and also has excellent electrical conductivity. In particular, when the size of a voltage applied to graphene is adjusted, the electrical conductivity and refractive index of graphene change. Using such a property, a focal length can be adjusted by adjusting the voltage applied to graphene.

However, when a diffractive lens is manufactured only using graphene, there is a problem that focusing efficiency decreases due to high light transmittance. Here, as in the varifocal lens 1 according to the embodiment of the present disclosure, TMDC may be stacked as a two-dimensional material on graphene to block unnecessary light passing through the first lens layer 210 at a blocked portion of the lens. In other words, in a case in which graphene and TMDC are stacked, reflection efficiency is excellent due to a Distributed Bragg reflector (DBR) effect. Accordingly, constructive interference is increased, and the focusing efficiency may be increased.

Here, looking into TMDC in more detail, TMDC refers to a material whose chemical formula is $MX_2$, wherein the M is an element belonging to transition metals of any one of Groups IV, V, and VI, and the X is an element belonging to the chalcogen group. For example, TMDC may be $MoS_2$, $MoSe_2$, $MoTe_2$, $WS_2$, $WSe_2$, $WTe_2$, or the like. The first lens layer 210 may be formed of TMDC described above or may include TMDC.

Meanwhile, as illustrated in FIGS. 1 and 2, the second lens layer 230 is stacked on the one surface of the transparent substrate 100 like the first lens layer 210. Here, as illustrated in FIG. 3, the second lens layer 230 is stacked on a second area 120 of the one surface of the transparent substrate 100. That is, the second lens layer 230 is formed in the same shape as the second area 120. Since the shapes of the second lens layer 230 and the second area 120 are the same, hereinafter, the shape of the second area 120 will be described using the shape of the second lens layer 230 shown in the drawings.

As illustrated in FIGS. 1 and 2, the second area 120 is formed to be disposed outward and apart from the first area 110. More specifically, the second area 120 is formed to surround the first area 110 while spaced a predetermined distance apart from an edge portion of the first area 110. Here, the second area 120 may be formed to cover the one surface of the transparent substrate 100 excluding the first area 110 and a space which is spaced apart from the first area 110.

The shape of the second area 120 is not limited. For example, in a case in which the first area 110 has a circular shape as illustrated in FIG. 2, the second area 120 may be formed in a shape from which a circular area larger than the first area 110 by a predetermined size is removed.

Like the first area 110, the second area 120 may be formed by a second graphene layer 231 and a second TMDC layer 232 being alternately stacked. Here, the number of stacked second graphene layers 231 and second TMDC layers 232 may be differently designed according to a target refractive index range and is not limited.

The second graphene layer 231 and the second TMDC layer 232 may be formed to have the same thickness as the first graphene layer 211 and the first TMDC layer 212, respectively, but the present disclosure is not limited thereto.

Since the second graphene layer 231 and the second TMDC layer 232 are formed of the same materials as the first graphene layer 211 and the first TMDC layer 212, and effects of stacking the second graphene layer 231 and the second TMDC layer 232 are the same as the effects of stacking the first graphene layer 211 and the first TMDC layer 212, description of the materials of the second graphene layer 231 and the second TMDC layer 232 and the effects of stacking the same will be replaced with the above description of the first graphene layer 211 and the first TMDC layer 212.

Meanwhile, as illustrated in FIGS. 1 and 2, the third lens layer 220 is stacked on the one surface of the transparent substrate 100 like the first lens layer 210 and the second lens layer 230. Here, as illustrated in FIG. 3, the third lens layer 220 is stacked on a third area 130 of the one surface of the transparent substrate 100. That is, the third lens layer 220 is formed in the same shape as the third area 130. Since the shapes of the third lens layer 220 and the third area 130 are the same, hereinafter, the shape of the third area 130 will be described using the shape of the third lens layer 220 shown in the drawings.

As illustrated in FIGS. 1 and 2, the third area 130 is formed to be disposed outward and apart from the first area 110 and disposed inward and apart from the second area 120. More specifically, the third area 130 is formed in the shape of a band surrounding the first area 110 while spaced a predetermined distance apart from an outer edge portion of the first area 110 and spaced a predetermined distance apart from an inner edge of the second area 120.

The shape of the third area 130 is not limited. For example, in a case in which the first area 110 has a circular shape as illustrated in FIG. 2, the third area 130 may be formed in a circular ring shape. However, in order to be connected to the power supply 400 which will be described below, the third area 130 may have a circular ring shape with one open side.

Like the first area 110, the third lens layer 220 may be formed by a third graphene layer 221 and a third TMDC layer 222 being alternately stacked. Here, the number of stacked third graphene layers 221 and third TMDC layers 222 may be differently designed according to a target refractive index range and is not limited. The number of third graphene layers 221 and the number of third TMDC layers 222 of the third lens layer 220 may be the same as the number of first graphene layers 211 and the number of first TMDC layers 212 of the first lens layer 210 and the number of second graphene layers 231 and the number of second TMDC layers 232 of the second lens layer 230. The third graphene layer 221 and the third TMDC layer 222 may be formed to have the same thickness as the first graphene layer 211 and the first TMDC layer 212, respectively, but the present disclosure is not limited thereto.

Since the third graphene layer 221 and the third TMDC layer 222 are formed of the same materials as the first graphene layer 211 and the first TMDC layer 212, and effects of stacking the third graphene layer 221 and the third TMDC layer 222 are the same as the effects of stacking the first graphene layer 211 and the first TMDC layer 212, description of the materials of the third graphene layer 221 and the third TMDC layer 222 and the effects of stacking the same will be replaced with the above description of the first graphene layer 211 and the first TMDC layer 212.

The third lens layer 220 of the varifocal lens 1 according to one modification of the embodiment of the present disclosure may be formed to be divided into a plurality of layers of bands in a width direction. For example, the third lens layer 220 may be formed to be divided into two layers of bands as illustrated in FIG. 4 or may be formed to be divided into three layers of bands as illustrated in FIG. 5.

As illustrated in FIG. 1 or 2, the varifocal lens 1 according to the embodiment of the present disclosure may further include a fourth lens layer 240. Further, the fourth lens layer 240 may be formed as a plurality of fourth lens layers 240 as necessary. Here, since the shape of the fourth lens layer 240 is the same as the shape of the third lens layer 220, and effects of the fourth lens layer 240 are the same as the effects of the third lens layer 220, description of the shape and effects of the fourth lens layer 240 will be omitted and replaced with the above description of the third lens layer 220.

Meanwhile, as illustrated in FIG. 2, the power supply 400 applies a voltage to the first lens layer 210, the second lens layer 230, and the third lens layer 220. A method of applying a voltage to the first lens layer 210, the second lens layer 230, and the third lens layer 220 is not limited, and various methods for supplying power may be applied.

For the power supply 400 to apply a voltage to the first lens layer 210, the second lens layer 230, and the third lens layer 220, the first lens layer 210, the second lens layer 230, and the third lens layer 220 are connected to be capable of electric conduction to a first terminal 410, a second terminal 420, and a third terminal 430, respectively, of the power supply 400.

Here, the power supply 400 applies a voltage based on the second lens layer 230 which is disposed at the outermost portion of the one surface of the transparent substrate 100 and covers the largest area of the one surface of the transparent substrate 100. That is, the size of a voltage applied to the first lens layer 210 is a potential difference between the first lens layer 210 and the second lens layer 230, and the size of a voltage applied to the third lens layer 220 is a potential difference between the third lens layer 220 and the second lens layer 230. Here, the voltage applied to the first lens layer 210 is referred to as a first voltage, and the voltage applied to the third lens layer 220 is referred to as a second voltage.

As illustrated in FIG. 6, the power supply 400 may adjust the sizes of the first voltage and the second voltage to adjust the refractive index of the light 2 passing through the varifocal lens 1 to various values and change focal lengths f1 and f2.

Here, in a case in which the fourth lens layer 240 is added as described above, the power supply 400 may also be connected to the added fourth lens layer 240. Accordingly, due to being able to also adjust a voltage applied to the fourth lens layer 240, the power supply 400 may adjust the focal lengths to a larger variety of values.

Figure 7:
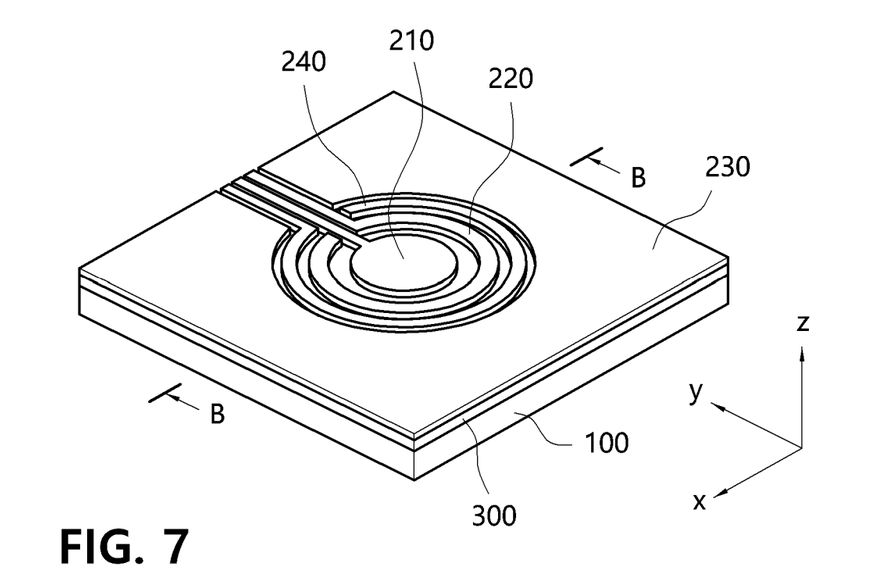
FIG. 7 is a perspective view of a varifocal lens according to another embodiment of the present disclosure.
Figure 8:
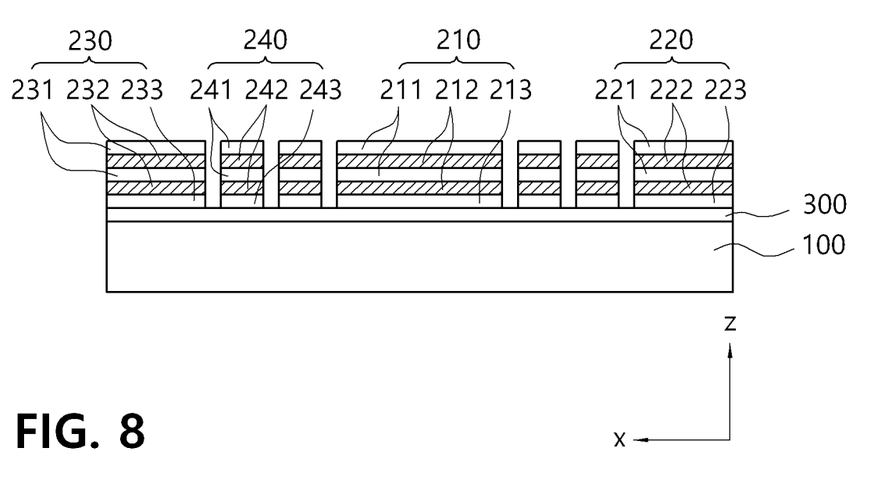
FIG. 8 is a cross-sectional view taken along line B-B of FIG. 7.

FIG. 7 is a perspective view of a varifocal lens according to another embodiment of the present disclosure. FIG. 8 is a cross-sectional view taken along line B-B of FIG. 7.

Referring to FIGS. 7 and 8, a varifocal lens 1 according to another embodiment of the present disclosure includes a transparent substrate 100, a first lens layer 210, a second lens layer 230, a third lens layer 220, a base electrode layer 300, a first insulating layer 213, a second insulating layer 233, a third insulating layer 223, and a power supply 400. Since the transparent substrate 100, the first lens layer 210, the second lens layer 230, and the third lens layer 220 according to the other embodiment of the present disclosure are the same as those according to the above-described embodiment of the present disclosure, description thereof will be omitted to avoid repeated description.

As illustrated in FIGS. 7 and 8, the base electrode layer 300 is formed in the shape of a plate having a predetermined thickness. The base electrode layer 300 is stacked on one surface of the transparent substrate 100. Accordingly, the base electrode layer 300 may be formed to cover the transparent substrate 100 as illustrated in FIGS. 7 and 8, but the size or shape of the base electrode layer 300 is not limited.

The base electrode layer 300 is formed of a material through which light can pass, such as glass or transparent plastic. The transparent substrate 100 may be formed in the shape of a plate through which light 2 is not refracted in a process in which the light 2 passes through the transparent substrate 100, but the shape of the transparent substrate 100 is not limited as long as the transparent substrate 100 can support the first lens layer 210, the second lens layer 230, and the third lens layer 220 which will be described below.

As illustrated in FIGS. 7 and 8, the material of the base electrode layer 300 is not limited as long as the material has electrical conductivity and light can pass therethrough. For example, the material of the base electrode layer 300 may be indium tin oxide (ITO), graphene, transparent conductive oxide (TCO), conductive polymers, metal grids, carbon nanotubes, nanowire meshes, ultra-thin metal films, or the like.

Unlike those according to the above-described embodiment of the present disclosure, the first lens layer 210, the second lens layer 230, and the third lens layer 220 of the varifocal lens 1 according to the other embodiment of the present disclosure are each disposed on a first area 110, a second area 120, and a third area 130 which are formed on the other side of the base electrode layer 300. That is, the base electrode layer 300 is disposed between the first lens layer 210, second lens layer 230, and third lens layer 220 and the transparent substrate 100.

Here, the first insulating layer 213 is stacked between the first lens layer 210 and the base electrode layer 300, the second insulating layer 233 is stacked between the second lens layer 230 and the base electrode layer 300, and the third insulating layer 223 is stacked between the third lens layer 220 and the base electrode layer 300. The first insulating layer 213, the second insulating layer 233, and the third insulating layer 223 prevent direct electric conduction between the first lens layer 210 and the base electrode layer 300, the second lens layer 230 and the base electrode layer 300, and the third lens layer 220 and the base electrode layer 300, respectively.

Figure 9:
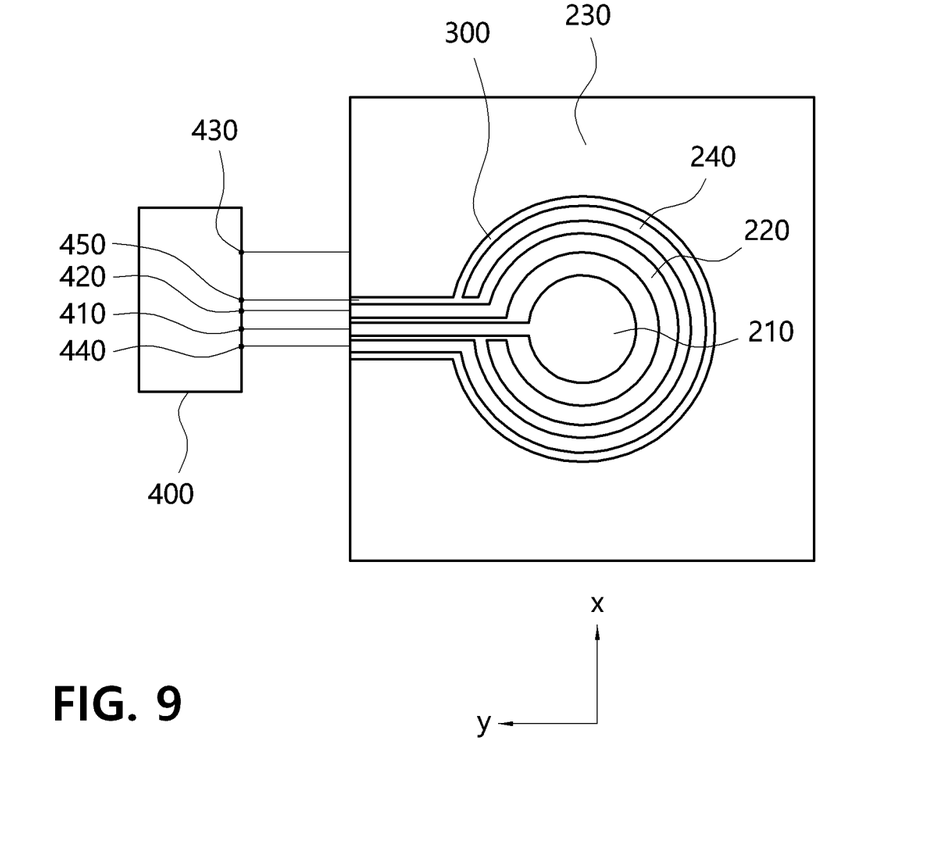
FIG. 9 is a wiring diagram of the varifocal lens according to the other embodiment of the present disclosure.

Here, as illustrated in FIG. 9, the power supply 400 applies a voltage to the first lens layer 210, the second lens layer 230, the third lens layer 220, and the base electrode layer 300. A method of applying a voltage to the first lens layer 210, the second lens layer 230, the third lens layer 220, and the base electrode layer 300 is not limited, and various methods for supplying power may be applied.

For the power supply 400 to apply a voltage to the first lens layer 210, the second lens layer 230, the third lens layer 220, and the base electrode layer 300, the first lens layer 210, the second lens layer 230, the third lens layer 220, and the base electrode layer 300 are connected to be capable of electric conduction to a first terminal 410, a second terminal 420, a third terminal 430, and a fifth terminal 450, respectively, of the power supply 400.

Here, the power supply 400 applies a voltage based on the base electrode layer 300. That is, the size of a voltage applied to the first lens layer 210 is a potential difference between the first lens layer 210 and the base electrode layer 300, the size of a voltage applied to the second lens layer 230 is a potential difference between the second lens layer 230 and the base electrode layer 300, and the size of a voltage applied to the third lens layer 220 is a potential difference between the third lens layer 220 and the base electrode layer 300. Here, the voltage applied to the first lens layer 210 is referred to as a first voltage, the voltage applied to the second lens layer 230 is referred to as a second voltage, and the voltage applied to the third lens layer 220 is referred to as a third voltage.

In this way, by including the base electrode layer 300, a larger number of potential difference combinations may be formed without increasing the left-right size of the varifocal lens 1. The refractive index changes according to the size of the voltage that the power supply 400 applies, and the range of possible refractive indices increases with an increase in the number of types of voltage sizes.

Also, since distances from the base electrode layer 300 to the first lens layer 210, the second lens layer 230, and the third lens layer 220 are the same, not only is it easy to maintain or control a potential, but also the DBR effect may be improved.

A varifocal lens according to an embodiment of the present disclosure can form a plurality of controllable focal lengths using a single lens.

A varifocal lens according to an embodiment of the present disclosure includes a first lens layer and a second lens layer each made of graphene and TMDC and thus can increase a refractive index change range.

A varifocal lens according to an embodiment of the present disclosure can minimize the size of the lens by controlling an applied voltage and changing a refractive index.

Advantageous effects of the present disclosure are not limited to the above-mentioned advantageous effects and should be understood as including all advantageous effects inferable from the detailed description of the present disclosure or the configuration of the disclosure stated in the claims.

The varifocal lens according to various embodiments of the present disclosure has been described above, but the application of the varifocal lens according to the embodiments herein is not limited to displays, and those of ordinary skill in the art to which the present disclosure pertains should clearly understand that the varifocal lens may also be used in other devices that require a lens that can change a focal length, such as cameras.

Example embodiments according to the present disclosure have been described above, and it should be self-evident to those of ordinary skill in the art that the present disclosure may be embodied in other specific forms, different from the embodiments described above, without departing from the gist or scope of the present disclosure. Therefore, the above-described embodiments should be considered illustrative rather than limiting, and accordingly, the present disclosure is not limited to the above description and may be changed within the scope of the appended claims or a scope equivalent thereto.

What is claimed is:

1. A varifocal lens comprising:
    a transparent substrate having a plate shape;
    a first lens layer stacked on a first area and formed on a first surface of the transparent substrate;
    a second lens layer stacked on a second area which is spaced apart from the first area and formed on the first surface of the transparent substrate; and
    a power supply connected to the first lens layer and the second lens layer to apply a first voltage to the first lens layer,
    wherein the power supply is configured to adjust the first voltage and change a refractive index of light, which is incident on a second surface of the transparent substrate and transmitted toward the first surface of the transparent substrate, to adjust a focal length, wherein a magnitude of the first voltage is the same as a potential difference between the first lens layer and the second lens layer, and wherein the first lens layer and the second lens layer include at least one graphene layer and at least one transition metal dichalcogenide (TMDC) layer which are alternately stacked outward from the first surface of the transparent substrate.

2. The varifocal lens of claim 1, wherein the second area is formed to be spaced apart from an edge portion of the first area and surround the first area.

3. The varifocal lens of claim 2, wherein the first area is formed in a circular ring shape.

4. The varifocal lens of claim 2, wherein the first area is formed in a circular shape.

5. The varifocal lens of claim 2, wherein:
the edge portion of the first area is divided from a central portion thereof; and
the edge portion of the first area is formed in a shape of a band having a predetermined width.

6. The varifocal lens of claim 1, wherein the TMDC layer includes a material whose chemical formula is $MX_2$, wherein M is an element belonging to transition metals of any one of Groups IV, V, and VI, and X is an element belonging to the chalcogen group.

7. The varifocal lens of claim 1, wherein the TMDC layer includes any one of $MoS_2$, $MoSe_2$, $MoTe_2$, $WS_2$, $WSe_2$, and $WTe_2$.

8. The varifocal lens of claim 1, further comprising a third lens layer stacked on a third area which is spaced apart from the first area and the second area and formed on the first surface of the transparent substrate,
wherein the power supply is connected to the third lens layer to apply a second voltage to the third lens layer, the power supply being configured to adjust the first voltage and the second voltage and change the refractive index of the light to adjust the focal length, and
wherein a magnitude of the second voltage is the same as a potential difference between the third lens layer and the second lens layer.

9. The varifocal lens of claim 8, wherein:
the second area is formed to be spaced apart from an edge portion of the first area and surround the first area; and
the third area is spaced apart from the first area and the second area and formed in a shape of a band having a predetermined width between the first area and the second area.

10. The varifocal lens of claim 9, wherein the third area is divided into a plurality of layers of bands in a width direction.

11. A varifocal lens comprising:
a transparent terminal having a plate shape;
a transparent substrate stacked on a first surface of the transparent terminal;
a first insulating layer and a first lens layer which are sequentially stacked on a first area formed on a second surface of the transparent terminal;
a second insulating layer and a second lens layer which are sequentially stacked on a second area which is spaced apart from the first area and formed on the second surface of the transparent terminal; and
a power supply connected to the first lens layer, the second lens layer, and the transparent terminal to apply a first voltage and a second voltage to the first lens layer and the second lens layer, respectively,
wherein the power supply is configured to adjust the first voltage and the second voltage and changes a refractive index of light, which is incident on the first surface of the transparent terminal and transmitted toward the second surface of the transparent terminal, to adjust a focal length,
wherein a magnitude of the first voltage is the same as a potential difference between the first lens layer and the transparent terminal,
wherein a magnitude of the second voltage is the same as a potential difference between the second lens layer and the transparent terminal, and
wherein the first lens layer and the second lens layer include at least one graphene layer and at least one transition metal dichalcogenide (TMDC) layer which are alternately stacked outward from the second surface of the transparent terminal.

12. The varifocal lens of claim 11, wherein the second area is formed to be spaced apart from an edge portion of the first area and surround the first area.

13. The varifocal lens of claim 12, wherein the first area is formed in a circular ring shape.

14. The varifocal lens of claim 12, wherein the first area is formed in a circular shape.

15. The varifocal lens of claim 12, wherein:
the edge portion of the first area is divided from a central portion thereof; and
the edge portion of the first area is formed in a shape of a band having a predetermined width.

16. The varifocal lens of claim 11, wherein the TMDC layer includes a material whose chemical formula is $MX_2$, wherein M is an element belonging to transition metals of any one of Groups IV, V, and VI, and X is an element belonging to the chalcogen group.

17. The varifocal lens of claim 11, wherein the TMDC layer includes any one of $MoS_2$, $MoSe_2$, $MoTe_2$, $WS_2$, $WSe_2$, and $WTe_2$.

18. The varifocal lens of claim 11, further comprising a third insulating layer and a third lens layer which are sequentially stacked on a third area which is spaced apart from the first area and the second area and formed on the second surface of the transparent terminal,
wherein the power supply is also connected to the third lens layer to apply a third voltage to the third lens layer and adjusts the first voltage, the second voltage, and the third voltage and changes the refractive index of the light to adjust the focal length,
a magnitude of the third voltage is the same as a potential difference between the third lens layer and the transparent terminal.

19. The varifocal lens of claim 18, wherein:
the second area is formed to be spaced apart from an edge portion of the first area and surround the first area; and
the third area is spaced apart from the first area and the second area and formed in a shape of a band having a predetermined width between the first area and the second area.

20. The varifocal lens of claim 19, wherein the third area is divided into a plurality of layers of bands in a width direction.

* * * * *